April 6, 1965 H. J. FERRIS 3,176,995
FLEXIBLE FLAIL FOR MATERIAL UNLOADER
Filed April 5, 1963 2 Sheets-Sheet 2
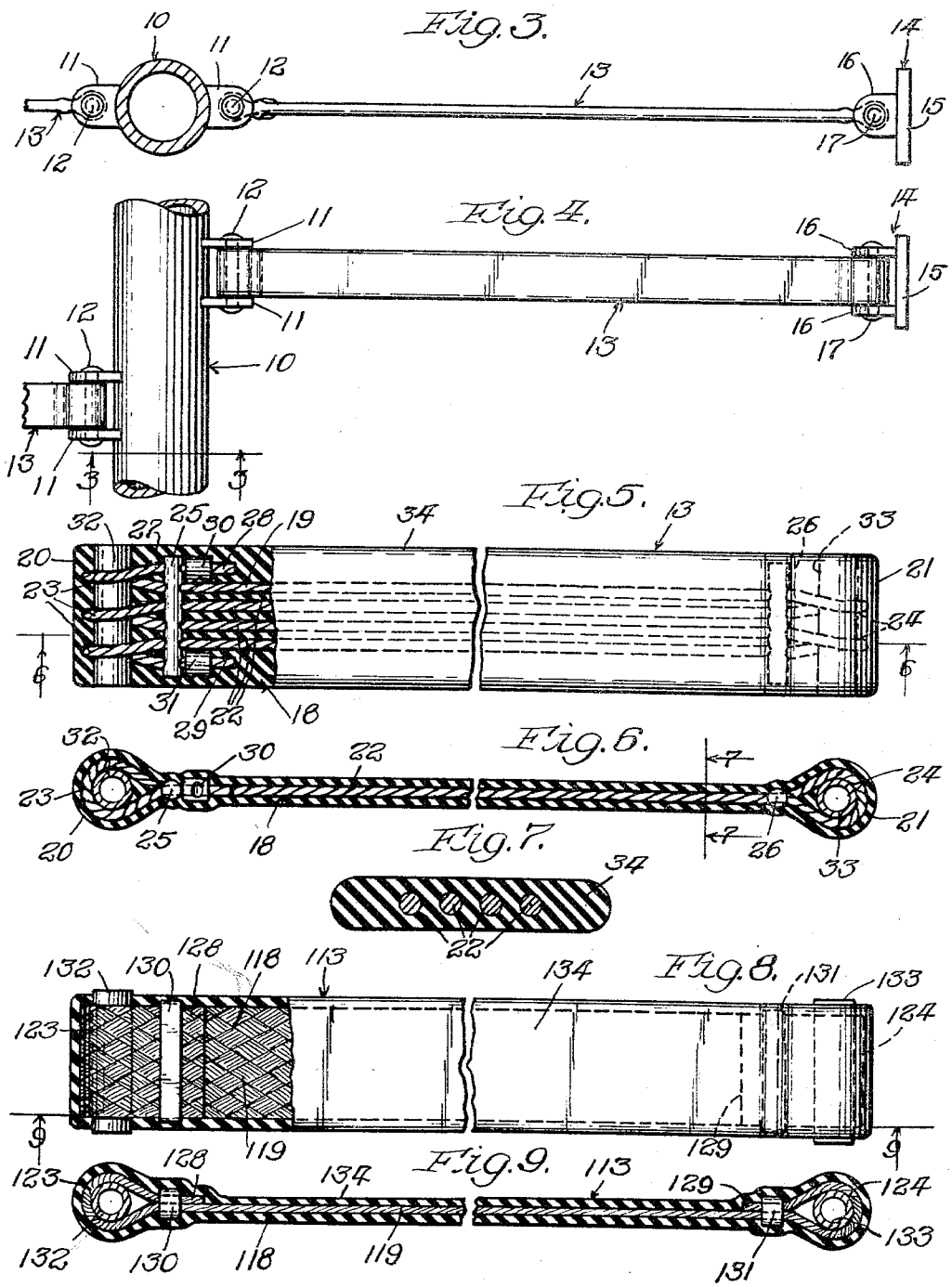

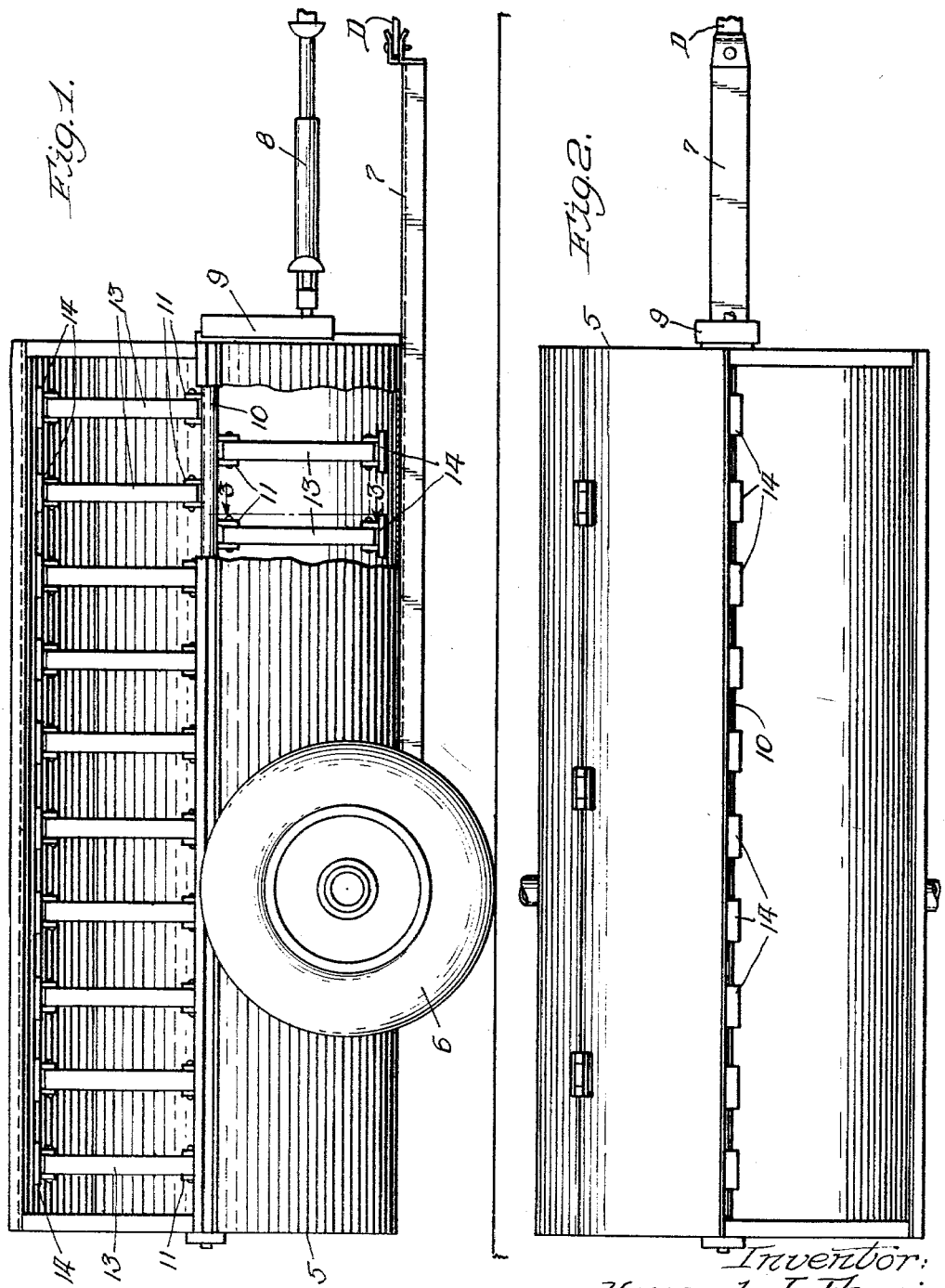

United States Patent Office 3,176,995
Patented Apr. 6, 1965

3,176,995
FLEXIBLE FLAIL FOR MATERIAL UNLOADER
Howard J. Ferris, Gulfport, Fla., assignor to Starline, Inc., a corporation of Illinois
Filed Apr. 5, 1963, Ser. No. 270,927
16 Claims. (Cl. 275—3)

This invention relates to a material handling device having flexible flails, and in particular it relates to such a device having a flail structure which is especially efficient in unloading and spreading the contents of the container.

Material discharging and spreading devices of the type disclosed and claimed in Elwick Patent 2,886,332 commonly utilize a flail consisting of a chain with a T-shape flail plate at the free end of the chain. Such chain type flails are subject to excessive breakage, even if heavy chain links are used; and such breakage is both dangerous and annoying because of the need for prompt replacement of a broken flail for satisfactory discharge and spreading of material from the spreader container.

The use of cables in place of chains has been suggested, but it is not possible to obtain cables of sufficient strength which will roll properly about the unloader shaft of such a device. Because of the heavy inherent load upon a tractor power take-off during the discharge of material, it is desirable to use a relatively small diameter unloader shaft to reduce the static load; and the commercial units presently on the market which are made in accordance with the Elwick patent disclosure have an unloader shaft that is only 4″ in diameter. However, the connecting strand portion of the flail must be capable of winding around the unloader shaft; and a rule of thumb used by cable manufacturers is that the smallest diameter about which a cable should be wound is at least 25 times the diameter of the cable, and preferably 40 times the diameter of the cable. Even if the diameter of the unloader shaft is increased from 4″ to 5″, the maximum permissible cable diameter is about 3/16″; and the strongest flexible high tensile steel cables of this diameter have an ultimate breaking strength of only about 3000 pounds. A study of the optimum weight of flail plates for use in a spreader of the Elwick type shows that the optimum plate generates a centrifugal pull great enough to require a cable strength of 9000 pounds, so that a 3/16″ cable is wholly inadequate for this purpose in a spreader 48″ to 50″ in diameter, which is the common commercial size. Sound engineering principles require that the ultimate cable strength be two to three times the minimum 9000 pound figure, which, with the 3/16″ cable, would require from six to nine cables between which the centrifugal thrust of the flail plate would be evenly divided.

Study of the mechanics of material discharge by the flails of the Elwick type spreader indicates that practically all the work of flinging material from the container is performed by the flail plates, and not by the connecting chains or other strands used for attaching the plates to the unloader shaft. Thus, the chain flail commonly used in such devices is extremely inefficient as well as being subject to excessive breakage between links. In operation, the flails appear to extend radially when they are at the upper end of the sweep about the axis of rotation of the shaft, and then they partially roll onto the shaft when they strike the material below the shaft and the chain is dragged over and through the material, pulling the flail plate behind it. The flail plate acts like a hoe, dragging the material out and flinging it; and the flail chain serves primarily as a connector. The constant winding and unwinding of the chain produces very rapid wear, especially between the chain links and the connector eyes on the unloader shaft and on the flail plate. Frequent oscillation of the flail plates as they strike areas of unequal resistance accentuates the wear problem by causing axial twisting of the chain. Such oscillation also reduces the efficiency of the flails by changing the angle of attack of the flail plates upon the material in the container from the optimum position parallel to the shaft. The present invention greatly reduces such axial twisting.

In accordance with the present invention, the flexible flail takes the form of a broad, relatively thin strap-like structure having a plurality of strands of high tensile material to provide a core, and the entire high tensile core is encased in a sheath which has a smooth outer surface to minimize flail skin friction as the flail is dragged across and through the material being discharged. Preferably the strands extend longitudinally of the flail. Likewise, the sheath is of a tough, resilient material such as rubber or a physically similar synthetic material, so that the sheath affords great protection from physical damage to the high tensile strands of the flail member. Stated in another way, the flail consists of a flexible strap of tough, resilient material having a smooth outer surface, and embedded within the strap is a plurality of strands of high tensile material. The flail is secured to the unloader shaft by a pin that is parallel to the shaft axis, and the flail plate is also secured by a pin that is normally parallel to said axis. This, combined with the broad, flat shape of the flail, minimizes oscillation of the flail plate.

The principal object of the present invention, therefore, is to provide a material unloader and spreader of the type disclosed in patent 2,886,332 having a rotatable shaft and improved flexible flails on the shaft, so that the entire unit functions in a more efficient manner.

Another object of the invention is to provide a flexible flail having an ultimate strength of 18,000 to about 27,000 pounds and having a smooth outer surface to minimize skin friction and provide increased efficiency of the unloader.

Yet another object of the invention is to provide a flail in which the connecting portion between the flail plate and the unloader shaft has a tough, resilient sheath which is only slightly susceptible to damage by contact with solid objects. One of the great sources of damage to the flail is the erratic whipping of the flail plates upon striking a solid object in the litter being unloaded and spread by the device, which may cause the flail plate to strike the next adjacent flail or flip around and smash the connecting strand or chain on which it is mounted.

Still another object is to provide a flail in which the connecting portion between the shaft and the flail plate is relatively resistant to axial twisting, and is caused little damage by such twisting as occurs.

A further object of the invention is to provide a flail which minimizes oscillation of the flail plate and thus tends to maintain the plate at the optimum angle of attack on material in the container.

The invention is illustrated in a preferred and an alternative embodiment in the accompanying drawings in which:

FIG. 1 is a side elevational view, with parts broken away, of a material unloader embodying the invention;

FIG. 2 is a plan view of such an unloader;

FIG. 3 is a fragmentary sectional view on an enlarged scale, taken substantially as illustrated along the line 3—3 of FIG. 1 or FIG. 4;

FIG. 4 is a plan view of the structure of FIG. 3;

FIG. 5 is a broken plan view, partially in section, illustrating one form of an improved flail used in the improved unloader;

FIG. 6 is a sectional view taken substantially as illustrated along the line 6—6 of FIG. 5;

FIG. 7 is a sectional view on an enlarged scale taken substantially as illustrated along the line 7—7 of FIG. 6;

FIG. 8 is a broken plan view, partially in section, illustrating a second form of improved flail used in the improved unloader; and FIG. 9 is a sectional view taken substantially as illustrated along the line 9—9 of FIG. 8.

Referring to the drawings in greater detail, and referring first to FIGS. 1 and 2, an unloader includes a container 5 having wheels 6, a tongue 7 for attachment to the drawbar D of a tractor, and a power shaft 8 of a tractor power takeoff which acts through a chain drive 9 to rotate an unloader shaft 10.

As best seen in FIGS. 3 and 4, the unloader shaft 10 is provided at intervals along its length with radially extending, spaced ears 11 each of which is perforated to receive a pintle 12 by means of which a flexible flail, indicated generally at 13, is pivotally connected to the unloader shaft. At the outer end of the flail 13 is a T-shaped flail plate, indicated generally at 14, which has a body 15 and a pair of spaced perforate lugs 16 through which a pintle 17 extends to connect the flail plate to the free end of flail 13.

Referring now to FIGS. 5 to 7, which illustrate a first embodiment of the flexible flail 13, high tensile flexible strand means, indicated generally at 18, provides core means of predetermined length. In the first flail structure the strand means consists of a single strand 19 of high tensile material such as steel wire or a fiberglass filament of suitable diameter. The strand 19 is doubled back and forth at opposite ends 20 and 21 to form core means consisting of a plurality of runs 22, with loops 23 and 24 at opposite ends, said loops being open at the sides of the flail. Spreader bars 25 and 26 are positioned, respectively, adjacent the loops 23 and 24 and, as seen in FIG. 5, each spreader bar is provided with a plurality of spaced holes 27 which are impaled by the runs 22 of the strand 19 to maintain said runs in laterally spaced relationship. The two end portions 28 and 29 of the single strand 19 terminate in the space between the spreader bars 25 and 26 and each said end portion is firmly secured alongside the bight portion of the parallel runs 22 by means of clamp lugs 30 which are crimped onto said end portions of the strand and abut the spreader bar 25 to retain the strand. Rigid sleeves 32 and 33 extend through the respective loops 23 and 24 to afford hollow bearings for the pintles 12 and 17.

A flexible sheath 34 encases the core means 18 afforded by the parallel runs 22 of the strand 19, and said sheath has a smooth outer surface to minimize flail skin friction. The sheath consists of a tough, resilient flexible material such as rubber or a rubber-like plastic, and encases all the runs 22, the loops 23 and 24, the spreader bars 25 and 26, and entirely fills the spaces between the runs to provide a broad, flat flail consisting essentially of a strap-like body of tough, resilient, flexible material in which are embedded a plurality of longitudinal runs of high tensile strand. As best seen in FIG. 6, the sheath 34 encircles the open sides of the loops 23 and the open ends of the rigid sleeves 32 and 33 so as not to interfere with free reception of the pintles 12 and 17 by said sleeves, which thus form hollow bearings.

Referring now to FIGS. 8 and 9, the second form 113 of the flexible flail has a high tensile core, indicated generally at 118, consisting of a plurality of fine steel wires or fiberglass filaments 119 which are seen in FIG. 8 to be woven in a criss-cross pattern which provides substantially continuous core means 118. The core means 118 has much the appearance of a flat, ribbon-like battery cable frequently used in motor vehicles.

The core means 118 has end portions which are doubled back upon themselves to provide loops 123 and 124 at the two ends of the flail, and the end portions 128 and 129 of the core are firmly secured alongside the bight portion of the core means 118 by means of clamping bars 130 and 131. Rigid sleeves 132 and 133 extend, respectively, through the loops 123 and 124 to afford hollow bearings for the pintles 12 and 17 of the unloader shaft 10 and the flail plate 14, respectively.

A sheath 134, composed of material identical with that heretofore described for the sheath 34, encases the high tensile core 118 and penetrates the interstices between strands 119, and also encases the clamps 130 and 131 and the loops 123 and 124 while leaving the open sides of each rigid tube unobstructed to receive the pintles.

It is apparent from the foregoing detailed description that the unloader of the present invention includes a flexible flail in which a broad, relatively thin band of flexible material (34 or 134) has high tensile flexible strand means (19 or 119) extending from end to end of the band and embedded in the flexible material.

The foregoing detailed description is given for clearness of understanding only and no unnecessary limitations should be understood therefrom, as modifications will be obvious to those skilled in the art.

I claim:

1. A flexible flail adapted to have one end detachably connected to one side of a rotatable shaft of a material handling device and to receive a flail plate at its opposite end, said flail comprising: a broad, thin, band of highly flexible material that has receiving means at each end for engagement with mounting means; and highly flexible high tensile reinforcing means embedded and substantially entirely encased within said flexible material, said reinforcing means extending from end to end of the band effectively in a single plane and extending around said receiving means so that tensioning stresses applied to the flail through the mounting means are borne principally by the reinforcing means, said flail being adapted to coil in a very small arc so as to wind closely around the shaft when the latter is rotated.

2. The device of claim 1 in which the reinforcing means comprises a plurality of generally parallel strands each of which extends from end to end of the band and around the receiving means so that tensioning stresses applied to the flail are borne generally equally by all the strands, the strands being separated from one another by the flexible material.

3. The device of claim 2 in which the parallel strands are parts of a single continuous length of strand material which is doubled back and forth to provide the parallel strands.

4. The device of claim 2 having means at each end engaging the strands to retain the latter in spaced relationship.

5. The device of claim 4 which includes a pair of transverse spreader bars embedded in the flail band immediately adjacent and between the receiving means, said spreader bars providing the means engaging the strands to retain the latter in spaced relationship.

6. The device of claim 1 in which the flexible material and the flexible reinforcing means are doubled back on themselves at an end of the flail to form a loop that constitutes the receiving means.

7. The device of claim 1 in which the receiving means includes a rigid sleeve in the loop to receive a pin.

8. The device of claim 1 in which the high tensile material consists of a plurality of interwoven strands, and in which the material of the sheath penetrates the interstices between strands.

9. The device of claim 1 in which the flexible material forming the band is a tough, rubber-like substance having a very smooth outer surface to minimize skin friction.

10. A flexible flail adapted to have one end detachably connected to one side of a rotatable shaft of a material handling device and to receive a flail plate at its opposite end, said flail comprising: a broad, thin band of highly flexible material that has receiving means at each end for engagement with mounting means; and a single, continuous high tensile, highly flexible strand doubled back and forth in the length of the band effectively in a single plane and extending around the receiving means to provide parallel runs so that tensioning stresses applied to the flail through the mounting means are borne generally equally by all the runs of the strand, said strand being embedded and substantially entirely encased within the flexible material and the end portions of the strand being firmly secured alongside the bight portions of said strand.

11. The device of claim 10 in which the flexible material and the flexible reinforcing strands are doubled back on themselves at an end of the flail to form a loop that constitutes the receiving means.

12. The device of claim 11 in which there are loops at both ends of the flail, and in which a pair of transverse spreader bars are embedded in the flail band immediately adjacent and between the loops, said spreader bars having means engaging the runs of the strand to retain said runs in spaced relationship.

13. The device of claim 12 in which the means engaging the runs of the strand are holes through the bars, the runs of the strand impale said holes, and lugs are secured to the end portions of the strand abutting the bars to retain the strand.

14. A flexible flail adapted to have one end detachably connected to one side of a rotatable shaft of a material handling device, said flail comprising: a broad, thin band or highly flexible material that has receiving means for engagement with mounting means on a shaft, high tensile, highly flexible reinforcing means embedded and substantially entirely encased within said flexible material, said reinforcing means extending from end to end of the band effectively in a single plane, and extending around said receiving means so that tensioning stresses applied to the flail through the mounting means are borne principally by the reinforcing means, said band being adapted to wind closely around the shaft when the latter is rotated; a heavy flail plate; and means securing the flail plate to the other end of the flail, said securing means being encircled by the reinforcing means so that tensioning stresses applied to the flail by the flail plate are borne principally by the reinforcing means.

15. The combination of claim 14 in which the flexible material and the flexible reinforcing means are doubled back on themselves at both ends of the flail to form loops and in which the mounting means on the shaft and the securing means for the flail plate comprises a pintle extending through one of the loops whereby the flail is pivoted on the shaft and the flail plate is detachably pivoted on the flail.

16. In a material unloader, in combination: a rotatable shaft which is no more than about five inches in diameter; mounting means on the shaft; a flail comprising a broad, thin band of highly flexible material that has receiving means engaged with said mounting means and securing the flail to the shaft with the breadth of the flail lengthwise of the shaft, high tensile, highly flexible reinforcing means embedded and substantially entirely encased within said flexible material, said reinforcing means extending from end to end of the band effectively in a single plane, and extending around said receiving means so that tensioning stresses applied to the flail through the mounting means are borne principally by the reinforcing means, said band being adapted to wind closely around the shaft when the latter is rotated; a heavy flail plate; and means securing the flail plate to the other end of the flail, said securing means being encircled by the reinforcing means so that tensioning stresses applied to the flail by the flail plate are borne principally by the reinforcing means.

References Cited by the Examiner
UNITED STATES PATENTS

| 2,560,524 | 7/51 | Johnson | 17—11.1 |
| 2,604,656 | 7/52 | Anderson et al. | 17—18 |
| 2,851,722 | 9/58 | Pangborn | 17—18 |
| 2,854,681 | 10/58 | Wells et al. | 56—29 |
| 2,886,332 | 5/59 | Elwick | 275—3 |
| 3,082,452 | 3/63 | Heine et al. | 15—93 |

ABRAHAM G. STONE, *Primary Examiner.*
WILLIAM A. SMITH III, *Examiner.*